United States Patent
Calderon (10) Patent No.: US 9,835,329 B2
(45) Date of Patent: Dec. 5, 2017

(54) METHOD AND APPARATUS FOR CONVERTING HYDROCARBONS INTO CLEAN ENERGY AND CO-PRODUCING VALUABLE BY-PRODUCTS, WHILE PREVENTING THE DISCHARGE OF POLLUTANTS INTO THE ATMOSPHERE

(71) Applicant: Albert Calderon, Bowling Green, OH (US)

(72) Inventor: Albert Calderon, Bowling Green, OH (US)

( * ) Notice: Subject to any disclaimer, the term of this patent is extended or adjusted under 35 U.S.C. 154(b) by 870 days.

(21) Appl. No.: 13/999,128

(22) Filed: Jan. 17, 2014

(65) Prior Publication Data

US 2015/0203771 A1  Jul. 23, 2015

(51) Int. Cl.
| | | |
|---|---|---|
| C01B 3/36 | (2006.01) |
| F23J 15/02 | (2006.01) |
| F02C 3/28 | (2006.01) |
| F01K 13/00 | (2006.01) |
| F23K 3/00 | (2006.01) |
| F01K 23/06 | (2006.01) |

(52) U.S. Cl.
CPC .............. *F23J 15/02* (2013.01); *F01K 13/00* (2013.01); *F01K 23/067* (2013.01); *F02C 3/28* (2013.01); *F23K 3/00* (2013.01); *C10J 2300/094* (2013.01); *F23J 2215/50* (2013.01); *Y02E 20/16* (2013.01); *Y02E 20/18* (2013.01); *Y02P 20/13* (2015.11)

(58) Field of Classification Search
CPC ................................................. C10J 2300/094
See application file for complete search history.

(56) References Cited

U.S. PATENT DOCUMENTS

| | | | | | |
|---|---|---|---|---|---|
| 3,853,498 | A | * | 12/1974 | Bailie | C01B 31/081 201/12 |
| 4,927,430 | A | * | 5/1990 | Calderon | C10J 3/62 201/16 |
| 5,728,271 | A | * | 3/1998 | Piskorz | B01J 8/1836 201/25 |
| 2008/0263952 | A1 | * | 10/2008 | Miyoshi | C10J 3/482 48/76 |
| 2010/0037667 | A1 | * | 2/2010 | Calderon | C05C 9/00 71/24 |
| 2011/0132737 | A1 | * | 6/2011 | Jadhav | C01B 31/20 201/28 |

(Continued)

*Primary Examiner* — Imran Akram (57) ABSTRACT

The present invention is an improvement in a number of ways of two issued patents identified in the preamble of the Specification which follows. Such improvement will yield a more reliable process that uses coal and other hydrocarbons but avoids the discharge of hazardous pollutants into the atmosphere and lowers investment costs. This invention offers a unique and comprehensive solution that makes possible the prevention of the ill-effects to health and environment while at the same time would also prevent the closure of badly needed power generation facilities that still provide some 40% of the electricity generated in this country. The herein comprehensive solution converts six pollutants into valuable co-products while low-cost, efficient, electric power is generated to result in attracting industries that will help keep badly needed jobs. This invention is also applicable to other disciplines.

34 Claims, 4 Drawing Sheets

(56) References Cited

U.S. PATENT DOCUMENTS

2012/0167467 A1* 7/2012 Kyo .................. C10J 3/463
48/197 R
2014/0030155 A1* 1/2014 Harada ................ C10J 3/48
422/146

* cited by examiner

FIG. 1

Source: DeCorso, S.M. 1983. Ensure gas-turbine components can handle coal-derived fuels. Power June: 53-56.

METHOD AND APPARATUS FOR CONVERTING HYDROCARBONS INTO CLEAN ENERGY AND CO-PRODUCING VALUABLE BY-PRODUCTS, WHILE PREVENTING THE DISCHARGE OF POLLUTANTS INTO THE ATMOSPHERE

The instant invention covers several improvements to two U.S. patents. The first one which was issued to present Applicant was filed on Nov. 9, 1994, and issued on Mar. 4, 1997, having U.S. Pat. No. 5,607,556; the second which was issued to Calderon et al. was filed on Aug. 18, 2008, issued on Aug. 16, 2011, having U.S. Pat. No. 7,998,236 B2; the present Applicant is Albert Calderon, the sole inventor.

INTRODUCTION

The herein improvements over the issued referenced patent comprise the following:
1. The physical separation of Gasification of char from Reduction of $CO_2$ for improved product fuel gas quality and for improved yield of 2CO from $CO_2$;
2. Superior control system for a more reliable process operability;
3. A better method of heating coal in devolatilizer 10;
4. Drastic reduction of heat loss in devolatilizer 10;
5. The reduction of capital cost while efficiently generating clean electric power;
6. Bottom ash (disposal) stored in polluting ponds retrieval and its conversion to inert marketable slag;
7. Separate activated carbon beds for Hg removal, one for the chemical feedstock for making fertilizer and the other for the clean fuel gas for generating electric power; and
8. Recovery of mercury in elemental form, a valuable by-product.

These improvements will be discussed in detail in the Description and Operation sections herein disclosed with the aid of FIGS. 1 through 5, which are part of the Specification of the invention. It is to be noted that the words "devolatilizer" and "pyrolyzer" referenced in several places herein are synonymous and whose function is to convert fossil fuels such as coal into char (carbon) and a combustable gas.

BACKGROUND

The renowned Clean Air Task Force (CATF), whose main office is in Boston, Mass., with several branches, issued in September 2010 a Report titled "The Toll From Coal" and subtitled "An Updated Assessment of Death and Disease from America's Dirtiest Energy Source." The first paragraph of the Report's Executive Summary states the following:

"Among all industrial sources of air pollution, none poses greater risks to human health and the environment than coal-fired power plants. Emissions from coal-fired power plants contribute to global warming, ozone smog, acid rain, regional haze, and—perhaps most consequential of all from a public health standpoint—fine particle pollution. In 2000 and again in 2004, the Clean Air Task Force commissioned comprehensive studies of health impacts caused by fine particle air pollution from the nation's roughly 500 coal-fired power plants. Each study incorporated the latest scientific findings concerning the link between air pollution and public health, as well as up-to-date emissions information. Both found that emissions from the U.S. power sector cause tens of thousands of premature deaths each year and hundreds of thousands of heart attacks, asthma attacks, emergency room visits, hospital admissions, and lost workdays."

The present invention is targeted to solving the serious pollution problems originating from the generation of electric power from plants which burn coal that may be forced to shut down by virtue of their being uneconomical to be retrofitted with inefficient and expensive pollution controls; see Exhibits 1 and 2. The pollutants from coal-burning power stations comprise $SO_2$, $NO_x$, Hg, Particulate Matter, Ash, and $CO_2$. This invention offers a unique and comprehensive solution of using coal but without combusting it to result in the prevention of the ill-effects currently caused to health and environment while at the same time would also prevent the closure of these badly needed power generation facilities that provide some 40% of the electricity generated in this country whose citizens so heavily depend on. In addition to the herein comprehensive solution, it will be disclosed in the specification that follows, the putting of all six pollutants mentioned above into beneficial use while avoiding the discharging of said pollutants into the atmosphere. It is no secret that the availability of natural gas is causing the displacement of coal to generate electric power by virtue that the generation of electric power with natural gas reduces the amount of emissions discharged into the atmosphere. The instant invention brings out a solution which actually has the objective to use fossil fuels like coal in such a way that it is closed to the atmosphere and is even a greater reducer of emissions than in the reduction of emissions credited when combusting natural gas to generate electric power.

OBJECTIVES

The main object of the present invention is to avoid the burning of coal in boilers of existing and new electric power stations by efficiently processing the coal upstream of the boilers in an environmentally closed system while producing clean gas or gases that are utilized to generate clean, low-cost power as well as valuable by-products.

Another object of the instant invention is to prevent layoffs from shutting down coal-burning power generating facilities and, instead, create many additional well-paying jobs.

Therefore another object of the present invention is to capitalize on existing infrastructure in the power stations that is quite costly to replace.

Yet another object of the instant invention is to create energy security by providing ample capacity to prevent black-outs.

Further another object of the present invention is to provide one comprehensive solution that will control $SO_2$, $NO_x$, Hg, Particulate Matter, Ash, and $CO_2$, from coal.

Still another object of the instant invention is to eliminate the need for pulverizing the coal, as pulverization is notorious in producing fine particulate matter that is injurious to health.

Further still another object of the present invention is to increase the availability of boilers currently used in coal-burning power stations, by avoiding the burning of coal altogether in boilers, which currently demand frequent maintenance caused by deposits within the boilers as a result of combusting coal in the boilers.

Further yet another object of the present invention is to generate clean electric power more efficiently while still using existing boilers to raise steam that can serve as the steam cycle of a hybrid, efficient combined cycle power generation.

It is therefore another object of the instant invention to increase capacity of power generation with low capital investment.

It is yet another object of the instant invention to increase the net profit of power producers using clean gases made from coal, which will enable such producers to offer attractive power costs to the consumer.

It is further still, another object of this invention to produce a solution to generate electric power from coal without combusting it that is superior than generating electric power from natural gas from the standpoint of reduction of emissions, while increasing efficiency and lowering costs.

Other objects of this invention will appear from the following detailed description and appended claims. Reference is made to the accompanying drawings forming a part of this specification wherein like reference characters designate corresponding parts in the various figures.

Before describing in detail the present invention, it is to be understood that this invention is not limited to the details or the arrangement of the parts illustrated in the attached drawings, as the invention can be made operative by using other embodiments. Also it is to be understood that the terminology herein contained is for the purpose of description and not limitation.

DETAILED DESCRIPTION OF THE DRAWINGS

Figure 1:
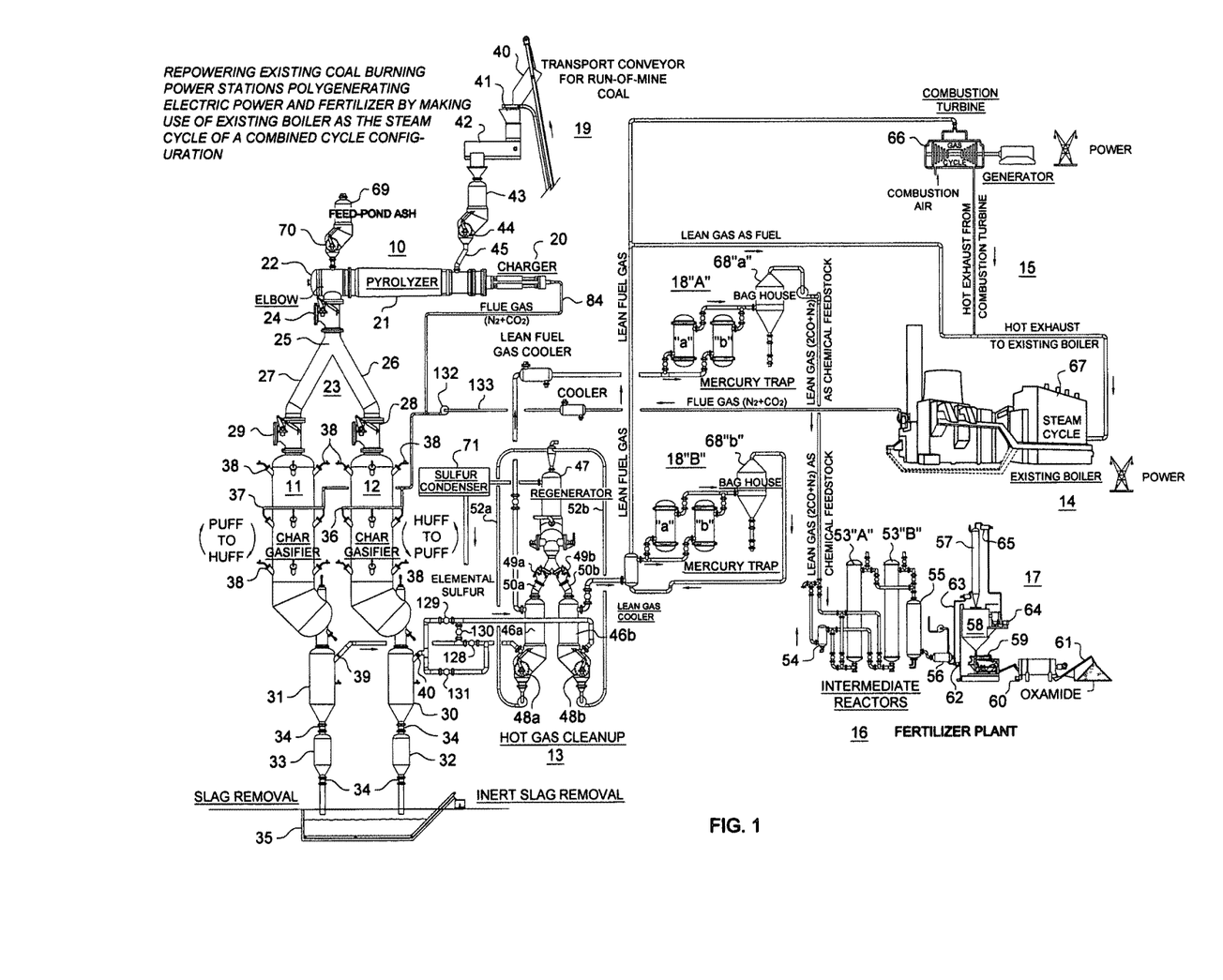
FIG. 1 is a general layout of the present invention.

Reference is made to FIG. 1 wherein the following numerals represent the main components: 10 marks the "pyrolyzer" which is also called devolatilizer"; 11 and 12 mark two alternating char gasifiers/reducers; 13 represents the hot gas cleanup; 14, the existing boiler house; 15, the combined cycle electric power generation system which includes the combustion turbine and the boiler house combination; 16, the alternating reducing reactors that produce the intermediate feedstock comprising the upstream portion of the fertilizer plant; 17, the fertilizer (oxamide) plant; 18"A" and 18"B", the dual beds of activated carbon for mercury removal; and 19 is the equipment to feed run-of-mine coal into pyrolyzer 10.

Pyrolyzer 10 is made up of charger 20, pyrolyzing chamber 21 which is designed with a taper that expands from its charging and towards an elbow marked by numeral 22, downcomer 23, and upper flow control valve 24, from which Y-shaped bifurcated pipe 25 forms a delivery pipe assembly, with pipe 27 connecting downcomer 23 thence to char gasifier (reducer) 11 by way of control valve 29, with pipe 26 connecting downcomer 23 to char reducer (gasifier) 12 by way of control valve 28. It is to be noted that gasifier (reducer) 11 and reducer (gasifier) 12 serve to perform three functions; namely, (i) the conversion of hot incandescent residual char discharged from pyrolyzer 10 into a raw lean fuel gas by gasifier (reducer) 11; (ii) the reduction of $CO_2$ into 2CO (a fuel or chemical feedstock) by reducer (gasifier) 12; and (iii) the conversion of coal ash (a polluter) into inert slag. It is to be noted that the role of 11 and the role of 12 cycle from gasifier (Puff mode) to reducer (Huff mode), and from reducer (Huff mode) to gasifier (Puff mode) while alternatively producing lean fuel gas during the Puff mode and reducing $CO_2$ to 2CO during the Huff mode; the placing of the gasifier and reducer in parenthesis is to annotate that the equipment placed in parenthesis will change roles from Puff to Huff and from Huff to Puff, with Puff representing acting as gasifier, and Huff acting as reducer.

At the bottom of gasifier (reducer) 11, slag quencher 31 is provided at the bottom of which lockhopper 33 is in turn provided below quencher 31; the same configuration is also provided at the bottom of reducer (gasifier) 12, with slag quencher marked by numeral 30 and lockhopper 32 under quencher 30. Isolation valves marked by numeral 34 control the flow from quenchers 30 and 31 into lockhoppers 32 and 33 respectively from which the slag is discharged into a collection tank marked by numeral 35.

Both gasifier (reducer) 11 and reducer (gasifier) 12 are characterized as a gasifier or a reducer depending upon their alternate use to act as a gas producer or as a reducer of $CO_2$ into 2CO and are equipped with injection ports marked by numeral 38, at different levels for a gas containing oxygen, such as air, which is injected to react with hot char discharged from pyrolyzer 10. The injection of air reacts with the hot char to produce a lean fuel gas which is discharged from either the top of slag quencher 30 or the top of quencher 31 by way of exhaust ports 40 or 39 respectively according to an operating sequence. At about mid-point of gasifier (reducer) 11 and reducer (gasifier) 12, special manifolds marked by numerals 36 and 37 respectively, serve for the injection of flue gas containing $N_2+CO_2$ for reducing the $CO_2$ into 2CO that serves as a feedstock for producing fertilizer. Even though both gasifier (reducer) 11 and reducer (gasifier) 12 are identical in structure as pressure vessels, they alternate functionally in such a way that when vessel 11 is operated as a gasifier (in the "Puffing" state), producing lean fuel gas, while vessel 12 is operated as a reducer (in the "Huffing" state), converting $N_2+CO_2$ into $N_2+2CO$, and both vessels keep alternating from "Puff" to "Huff" (gasification to reduction) and from "Huff" to "Puff" (reduction to gasification).

It is to be noted that gasifier (reducer) 11 and reducer (gasifier) 12 instead of being separate vessels, can be replaced by a single vessel equipped with a permanent partition creating two separate identical compartments and identified as X and Y, within which the functions of gasification and reduction take place in such a way that when X is operating in the Puffing mode as a gasifier, Y is operating in the Huffing mode as a reducer and when Y is operating in the Puffing mode as a gasifier, X is operating in the Huffing mode as a reducer. This pattern of alternating roles of X and Y will be the normal mode of operation wherein hot char will be fed to the two compartments from the discharge end of pyrolyzer 10 while ash converted into slag will flow from the bottom of the single vessel.

The equipment to feed the run-of-mine coal into pyrolyzer 10, marked by numeral 19, comprises skip 40 which elevates the run-of-mine coal from ground level and feeds by way of hopper 41 into conveyor 42 which in turn delivers to feeder 44 by way of lockhopper 43 to cause the feeding of the coal by means of chute 45 into the charging end of pyrolyzer 10. A secondary surge hopper marked by numeral 69 serves to feed polluted boiler ash by way of feeder 70 produced from coal combustion that had been stored in storage-ponds and classified as hazardous material. In feeding such hazardous material into either gasifier (reducer) 11 or reducer (gasifier) 12, such ash is caused to mix with the ash from the freshly fed char from pyrolyzer 10 into either 11 or 12 when acting as gasifier that is capable of converting ash into inert slag, thus providing a way of converting the old, hazardous ash (a polluting legacy that needs addressing from existing coal combustion boilers to raise steam) and the newly formed ash from the instant invention wherein they are jointly converted into inert slag for use in road construction and possibly in glassmaking as a feedstock.

Gas cleanup 13 is made up of three vessels, marked by numerals 46"$a$", 46"$b$", and 47. Vessels 46"$a$" and 46"$b$" serve to crack and simultaneously desulfurize the lean fuel gas (volatile matter) from either gasifier (reducer) 11 or reducer (gasifier) 12, fed from exit ports 39 or 40 of quenchers 31 and 30 respectively, to result in hot cleaning the lean fuel gas generated and vessel 47 serves to regenerate the spent sorbent from vessels 46"$a$" and 46"$b$" while producing elemental sulfur directly marked by numeral 71. All three vessels are equipped with feeders to cycle the desulfurizing catalyst. Vessels 46"$a$" and 46"$b$" interconnect with vessel 47 via a piping system that is marked by numeral 50"$a$" and 50"$b$". Gas cleanup 13 is equipped with pneumatic transporters 52"$a$" and 52"$b$" to convey the spent catalyst (sorbent) from vessels 46"$a$" and 46"$b$" to regenerator 47. Feeders 48"$a$" and 48"$b$" control the flow of the sorbent from vessels 46"$a$" and 46"$b$" respectively while control valves 49"$a$" and 49"$b$" feed regenerated sorbent into vessels 46"$a$" and 46"$b$" respectively.

Cyanogen (feedstock for the production of oxamide, a slow-release fertilizer) marked equipment 16 comprises reactor 53"A" and reactor 53"B" with gas temperature moderator denoted by numeral 54 being upstream of reactors 53"A" and 53"B," and chiller-liquefier which is denoted by numeral 55, being located downstream of reactor 53"B". A separator marked by numeral 56 is provided to segregate the liquefied cyanogen from the unreacted gases which are directed (not shown) to pyrolyzer 10, or recycled back to either reactor 53"A" or 53"B".

Downstream of separator 56, fertilizer plant 17 is located. It consists of reactor 57, settling tank 58, filter press 59, drier 60, and stacker 61. Pump 62 is provided to separator 56, to pump the liquefied cyanogen to evaporator 63, and pump 64 serves to circulate the liquid catalyst to the top of reactor 57; a heater denoted by numeral 65 serves to adjust the temperature of the liquid catalyst.

The mercury removal system marked by numeral 18"A" and 18"B" (also known as mercury traps) consist of each having activated carbon beds, "$a$" and "$b$," with the practice being when bed "$a$" is in absorption of mercury, bed "$b$" is in stand-by mode, and when bed "$b$" is in absorption, while bed "$a$" is in stand-by mode. Baghouses that serve as filters are marked by numeral 68"$a$" and 68"$b$". It is to be noted that mercury trap 18"A" is to de-mercurize the chemical feedstock gas ($2CO+N_2$) and mercury trap 18"B" is to de-mercurize lean fuel gas. A configuration of mercury capture is described hereinafter in FIG. 5, wherein the recovery of elemental mercury from saturated activated carbon beds is produced, which is considered a "valuable by-product".

Figures 2, 2A:
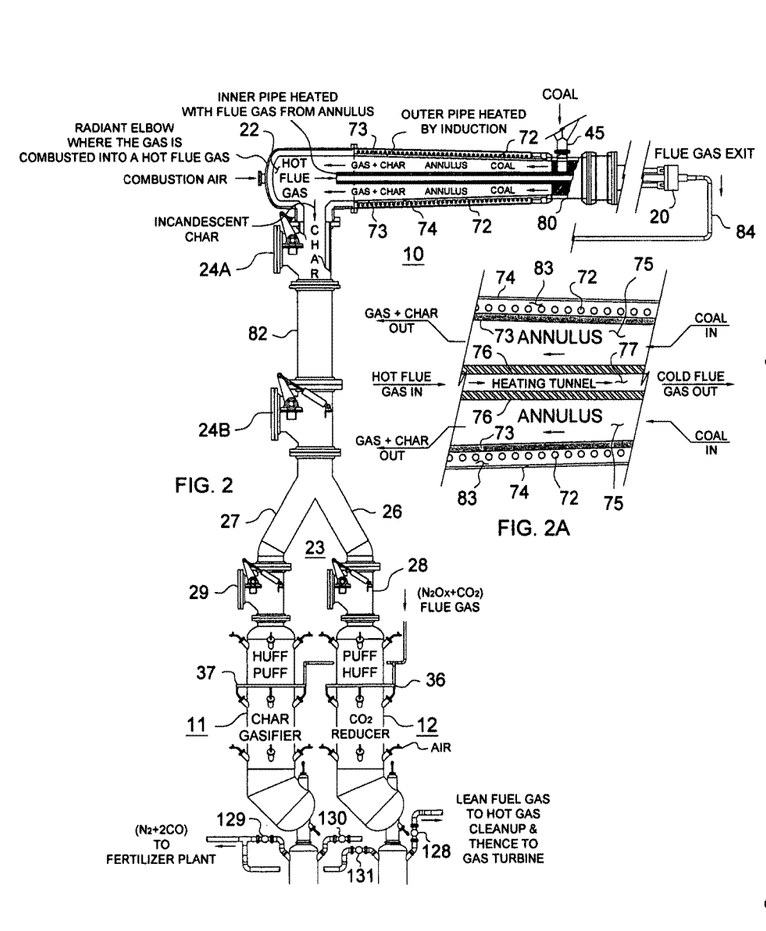
FIG. 2 illustrates a side view of a pyrolyzing reactor, with a portion of the outer shell being omitted in order to show its internals, which can efficiently process run-of-mine coal in the form of bituminous, sub-bituminous, lignite, peat, also biomass, medical waste, municipal waste, etc., while including two identical pressure vessels into which hot char (carbon) is regularly fed, with both vessels being adapted to act as gasifiers (gas producers by oxidation of carbon) and both vessels being adapted to act as reducers (converters of $CO_2$ into 2CO) with the mode of operating the vessels wherein if one of the vessels is operating as a gasifier, the other being operated as a reducer and vice versa. These two vessels shown in FIGS. 1, 2 and 2A are situated downstream from the pyrolyzing reactor and functionally alternate from one acting as gasifier that emits thermal energy and produces gas, to the other acting as reducer that loses thermal energy while converting $CO_2$ to 2CO.
FIG. 2A is an enlarged partial view of the pyrolyzing reactor showing its internals.

Referring now to FIGS. 2 and 2A for additional detail at a larger scale of pyrolyzer 10, ram 80 is adapted to advance and retract, while pushing the coal continually through the pyrolyzer in the form of an annulus marked by numeral 75, while it is heated continuously and bi-directionally by providing induction heating on the outer perimeter of the annulus by means of pipe 73; and by providing hot flue gas, the heating of the inner perimeter is effected by means of pipe 76. To describe this approach of bi-directional heating in more detail, induction heating comprises electric coil 72 and outer shell 74 with shunts and insulation 83 between the coil and the shell in order to efficiently heat the coal annulus on its outer periphery; and using hot flue gas produced by combusting coal gas produced from the heating of the annulus by means of induction, which is directed towards elbow 22, a very hot flue gas is produced which is exhausted through pipe 76 which serves as a heating tunnel surrounded by the inner periphery of the annulus. It is to be noted that the original source of the hot flue gas originates from the combustion of volatile matter released continuously from the coal produced in annulus 75 and discharged into radiant elbow zone 22 where the coal gas in the form of volatile matter is combusted with a gas containing oxygen such as air to convert the volatile matter into a hot flue gas which is by design directed to flow through tunnel 76 towards the cold, coal charging end of pyrolyzer 10, and leaving as a cool gas from pyrolyzer 10 by means of pipe 84 that leads the flue gas ($N_2+CO_2$) to the reducer which is operating under the Huffing sequence, to result in having the internal periphery of the annulus heated by conduction with thermal energy derived from the hot flue gas flowing through tunnel 77.

Figure 3:
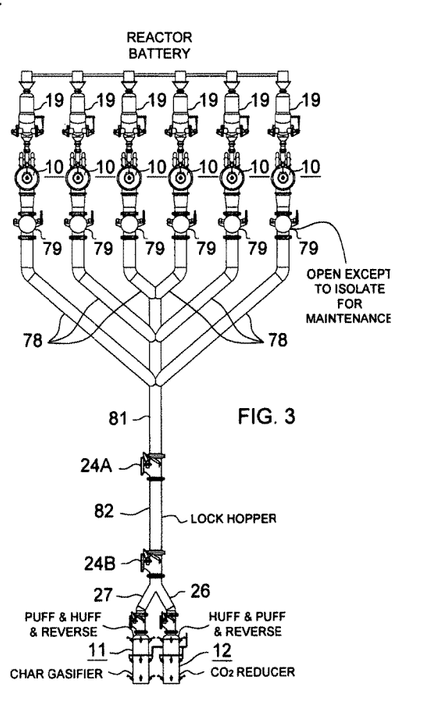
FIG. 3 illustrates an end view of a battery made-up of several pyrolyzing reactors with the two gasifiers (reducers) being shown in part, demonstrating a commercial application.

Referring to FIG. 3, a battery of pyrolyzers illustrated as a commercial scale unit is conceived; it possesses six pyrolyzers which are marked by numeral 10, and six coal feeding systems marked by numeral 19. Downstream of each pyrolyzer 10, a maintenance valve is provided and marked by numeral 79, from which individual pipes marked by numeral 78 form a candelabra-like design for gathering hot char made in the six pyrolyzers to result in a common receiving pipe marked by numeral 81 with lockhopper 82 being equipped with upper control valve 24A and lower control valve 24B to control the flow of the hot char from pyrolyzers 10 to either gasifier (reducer) 11 or to reducer (gasifier) 12, depending whether the sequence of being Puffed for gasification of the char to produce crude lean fuel gas, and being Huffed for reduction of flue gas $N_2+CO_2$, in reducer 12, into $N_2+2CO$, which is used as a chemical feedstock to produce fertilizer, explained in the description with reference to FIG. 1.

Figure 4:
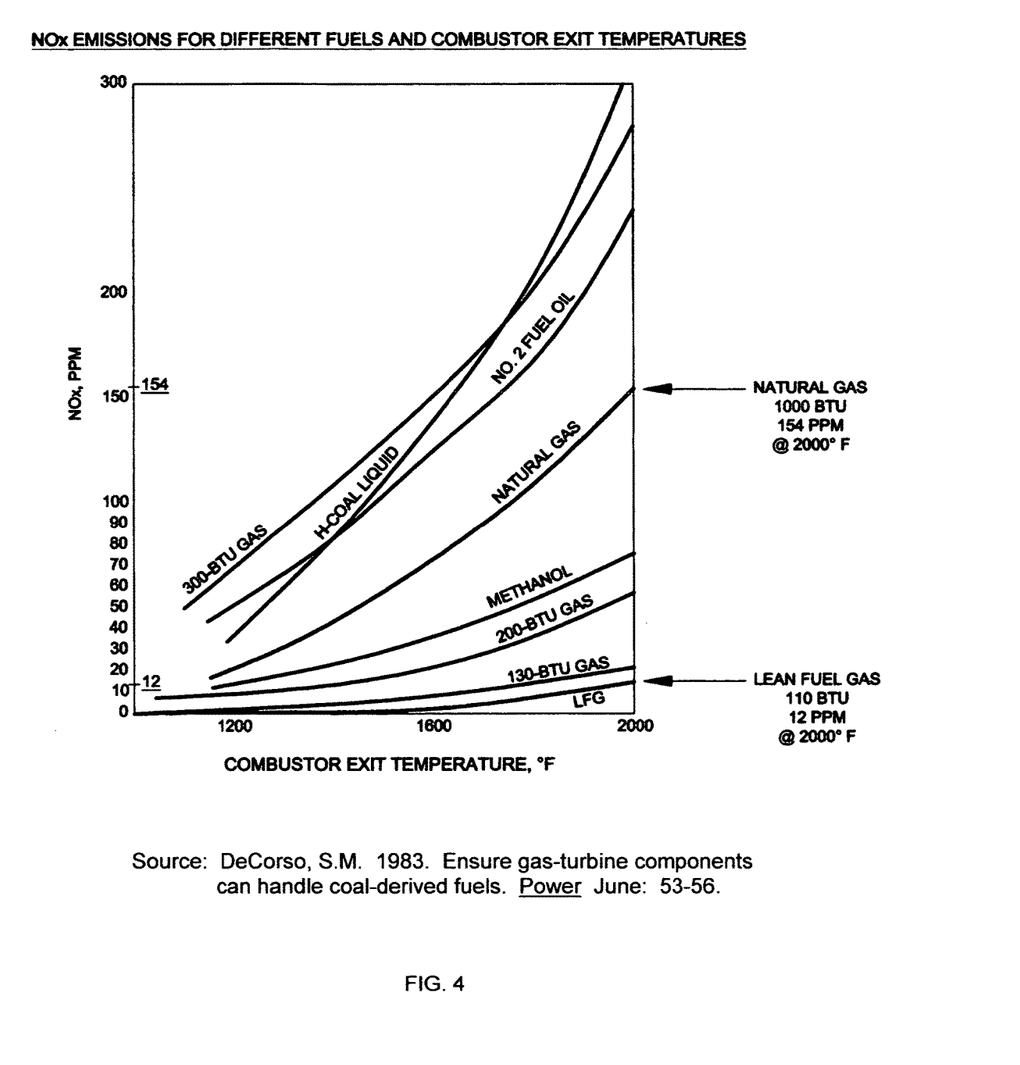
FIG. 4 is a graph showing $NO_x$ emissions from various fuels in parts per million in relation to combustor exit temperatures.

Referring to FIG. 4, it illustrates at the vertical line on the left, the number of parts per million (ppm) of $NO_x$ produced and on the horizontal line the temperature at which the corresponding number of ppm of $NO_x$ produced and at the vertical line on the right the resultant number of ppm of $NO_x$ for various gases whose BTU's are taken into consideration; this enables the plotting of curves that identify the characteristic of each gas with respect to $NO_x$ emissions at a specific combustor exist temperature. By way of example, at 2000° combustor exit temperature, natural gas produces 154 ppm whereas lean fuel gas produces 12 ppm, only some 7.8% of $NO_x$ as that produced by natural gas.

Figure 5:
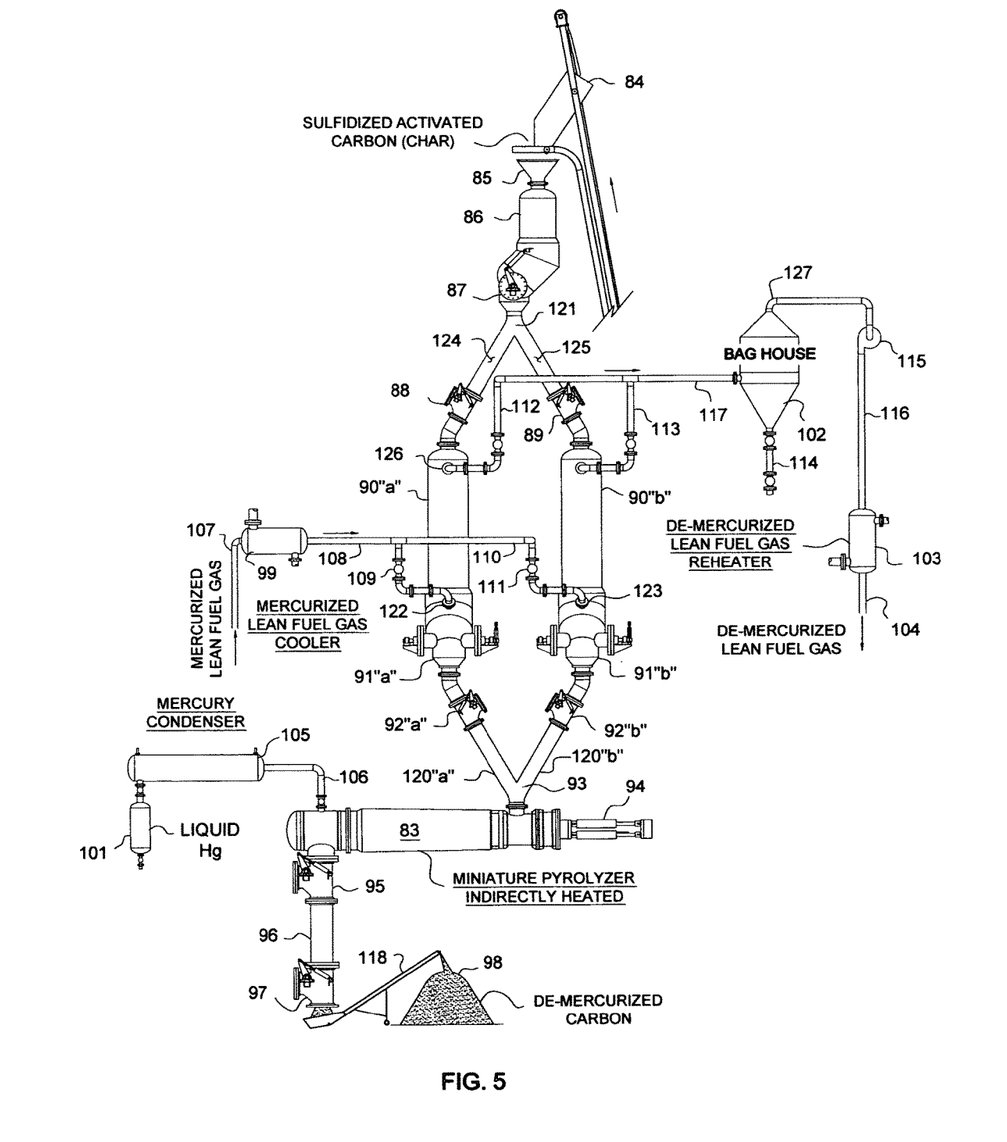
FIG. 5 illustrates the trapping of mercury from coal-derived gases by means of activated carbon (char) produced in-house but with the addition of the recovery of elemental mercury (Hg) from the mercurized activated carbon.

Referring to FIG. 5, it illustrates the way of trapping mercury and recovering the mercury as elemental mercury, a very valuable product. This Figure consists of activated carbon beds 90"a" and 90"b". By way of example, bed 90"a" would de-mercurize the lean fuel gas, and bed 90"b" would be on stand-by as spare to relieve bed 90"a" during its maintenance. Prior to the gas being de-mercurized, the lean fuel gas is passed through cooler 99 by way of a stream marked by numeral 107, to drop the temperature of the gas to render the de-mercurization of the gas effective, as de-mercurization takes place at low temperature.

Bed 90"a" gets charged from the top with activated carbon, by making use of skip hoist 84, followed by funnel 85 into hopper 86, thence to feeder 87 and by means of chute 124 and control valve 88 the activated carbon which is prepared in-house from some char, forms filter bed 90"a". To connect cooler 99 to the bottom of bed 90"a", line 108 is provided and by means of valve 109 the gas enters bed 90"a" at injection point 122 which flows upwardly within bed 90"a" and exits at the top of bed 90"a" at point 126; thence by means of pipes 112 and 117 the de-mercurized gas enters a baghouse marked by numeral 102, to remove particulate matter such as char (carbon) entrained in the lean fuel gas, which can be recycled as activated carbon make-up. Exit port 127 is provided to direct the cleaned gas to compressor 115 thence by means of pipe 116 the gas is delivered to re-heater 103 while leaving it in a de-mercurized condition to be delivered by means of pipe 104.

To regenerate the saturated (mercurized) carbon from bed 90"a", valve 92"a" discharges the mercurized carbon into the charging chamber of miniature pyrolyzer marked by numeral 83 by way of manifold 120"a", within which the mercurized carbon is heated indirectly, causing the vaporization of the mercury which is directed from pyrolyzer 83 to condenser 105 using line 106 where the recovered mercury is cooled and collected in liquid form in tank 101. The feed of the mercurized carbon through pyrolyzer 83 is affected by a ram pusher marked by numeral 94, and the de-mercurized carbon is discharged from pyrolyzer 83 by means of lockhopper 96 having an upper valve marked by numeral 95 and a lower valve marked by numeral 97, while the de-mercurized carbon is identified by numeral 98 as a pile which is served by conveyor 118.

OPERATION

In the application of this invention at commercial scale based on extensive test work that had taken place in Applicant's process development unit, the operation begins by using unprepared, crushed run-of-mine coal preferably of three inches and under, which contributes to savings by eliminating the step of pulverization of the coal, that is directly charged into the cold end of pyrolyzer 10, of the battery shown in FIG. 3. Since all six pyrolyzers are identical, for reference, FIGS. 2 and 2A will be used for the detailed description of a single pyrolyzer. Pushing ram 80 pushes the coal at the charging end of pyrolyzer 10 to force feed the coal into the chamber formed within pyrolyzer 10 as an annular configuration.

With continuous charging of the coal an annulus of coal is formed at the charging end of pyrolyzer 10, and with the aid of pushing ram 80, a force feeding pattern is created which induces the annulus to keep moving within the chambers of the pyrolyzers with coal gas being continuously produced while the coal is continuously heated to cause the conversion of the coal into char. The char so formed by the time the fed coal reaches the discharging end of pyrolyzer 10, can also be called coke or even metallurgical coke by charging certain coals while making use of the equipment described herein with the objective of producing coke for the ironmaking industry. To attain high efficiency, the coal in the annulus is heated bi-directionally by means of alloy steel pipes 73 and 76, as marked in FIGS. 2 and 2A, with pipe 73 being heated by any means but preferably by using electric induction to heat the outer periphery of the annulus; and with pipe 76 which forms a tunnel extending the entire length of pyrolyzer 10, marked by numeral 77, within which a hot flue gas flows continuously to heat the inner periphery of the annulus, with the flue gas originating from the combustion of the gas produced by heating of the coal in annulus 75, while producing a hot volatile matter (coal gas) consisting of a highly combustible high $H_2$ coal gas which flows towards the discharge end of pyrolyzer reactor 10. Such end takes the shape of a 90° elbow marked by numeral 22 that serves as a radiant chamber wherein the hot char (coke) separates from the coal gas by means of continual, gravitational drops into lockhopper 82 shown in FIG. 2. Radiant elbow 22 consists of an ideal, reflective (radiant) combustion chamber where the coal gas is ignited and burned within the chamber 22 forming a hot flue gas that can only flow from chamber 22 through inner pipe 76 (the tunnel) which is purposely designed to serve as a single, special outlet towards and through the entire length of pyrolyzer 10 and exit at the coal charging end of pyrolyzer reactor 10 while intensively heating the wall of pipe 76 as the hot flue gas flows therein, resulting in transferring extensive thermal energy by means of conduction from the circular wall of tunnel 77 to the inner periphery of the annulus.

Since lockhopper 82 in FIG. 2 is equipped with upper valve 24A and lower valve 24B, they alternate from being open or closed in such a way that valve 24B is always closed when valve 24A is open, and valve 24B is open when valve 24A is always closed; this feature is provided to maintain the pressure within pyrolyzer reactor 10 since their internals are continuously maintained under pressure. With this approach and the operation of the internals of pyrolyzer 10 being operated under positive pressure, a most efficient mode of transferring thermal energy from the coal that produces hot char which is fed to gasifier (reducer) 11 and reducer (gasifier) 12 by way of lockhopper 82. In the case of the battery shown in FIG. 3 which consists of six pyrolyzers which feed the char by way of a simulated candelabra made-up of a piping configuration marked by numeral 78, the flow of the hot char is directed to either char gasifier (reducer) 11, which would be in the Puffing state, or $CO_2$ reducer (gasifier) 12 which would be in the Huffing state.

With respect to the hot char, reference is made to FIG. 1, wherein a part of the hot char is gasified with air in gasifier (reducer) 11, producing a raw lean fuel gas which is directed first to hot gas cleanup 13, through vessel 46"b" by way of control valve 129 for cracking and desulfurization thence fed to a lean gas cooler to drop its temperature before passing through activated carbon bed "a" of mercury (Hg) trap 18"b" for the removal of the mercury from the lean fuel gas which is next directed to combustion turbine 66 to fuel the turbine with clean, de-mercurized, lean fuel gas to generate efficient, clean electric power by virtue of the pressurized mass of the lean fuel gas while producing a hot flue gas containing low oxides of nitrogen (NOx) and carbon dioxide ($CO_2$) as illustrated in FIG. 4.

For additional detail, the electric power generation system in this invention, marked by numeral 15, is fueled with a de-mercurized, clean, lean fuel gas fed from hot gas cleanup vessel 46"b" and de-mercurization bed 18"B", shown in FIG. 1, comprises combustion turbine marked by numeral 66 that is connected to existing boiler house 67 which contains a heat recovery steam generator (boiler) and a steam turbine by advantageously making use of the very valuable existing equipment which is expensive to replace, while also being joined with combustion turbine 66, a low-cost combined cycle configuration is created; such configuration provides a most efficient way of generating electric power while still providing higher availability when compared to burning coal in the boiler that is affected negatively by bottom ash, as the current approach eliminates the combustion of coal. If the supply of the hot exhaust from turbine 66 is inadequate, some clean, lean fuel gas that is already produced is fed as supplement fuel to the boiler by means of a special duct serving as a side stream from that which supplies combustion turbine 66. Instead of discharging the flue gas ($N_2+CO_2$) from boiler 67 into the atmosphere, the flue gaS in the form of $NO_x+CO_2$ is cooled, directed by means of stream 133, compressed by means of compressor 132 and fed to gasifier (reducer) 11 or reducer (gasifier) 12, depending on which one is in the "HUFF" part of the cycle, for reducing the $CO_2$ to 2CO.

As referenced above, there are six pollutants as a result of combusting coal in existing coal-fired boilers to raise steam which is fed into steam turbines to generate electric power inefficiently. These pollutants consist of: $SO_2$, $NO_x$, Hg, Particulate Matter, Ash, and $CO_2$. The comprehensive solution of the instant invention is to convert all the six pollutants into valuable products instead of wastes being discharged into the atmosphere or buried in landfills or some geologic formation which is costly, inefficient, and must be continuously monitored.

The herein invention addresses these six pollutants by converting them into useful products as follows:
1. Sulfur Dioxide ($SO_2$)—Sulfur is quite common as an inherent component of coal which when combusted becomes $SO_2$. By not combusting the coal but pyrolyzing it, the sulfur takes the form of $H_2S$ that reacts with CaO in hot gas cleanup vessel 46"a" to become carbon-impregnated CaS, which, when regenerated, the sulfur is released as elemental sulfur, a valuable by-product, which is collected and mixed with the fertilizer to increase crop yield.
2. Oxide of $N_2$ ($NO_x$)—It is the objective of this invention to purposely produce Lean Fuel Gas (LFG) and use it for two reasons (i) it generates power efficiently by possessing greater mass and (ii) produces very low $NO_x$ (12 ppm) as explained above, and when compared to the combustion of natural gas ($CH_4$), which is considered to be very clean by industry and by the general public, that in fact is not the case because the $NO_x$ production from natural gas is some 154 ppm as shown in FIG. 4, which equates to some 12.8 times (1,280%) greater than the $NO_x$ produced, from combusting the Lean Fuel Gas produced by the instant invention and shown in FIG. 4. Even though the $NO_x$ is quite low (12 ppm), the flue gas in the application of the technology disclosed herein is not discharged into the atmosphere.
3. Mercury capture (Hg)—The mercury traps shown in FIGS. 1 and 5 are adapted to remove the mercury by means of sulfidated activated carbon (char) made in-house wherein mercurized lean fuel gas is de-mercurized through bed "a" of system 18"B" shown in FIG. 1, while bed "b" serving as spare, or as shown in FIG. 5, lean fuel gas is de-mercurized through bed 90"a" while bed 90"b" serving as spare. Referring again to FIG. 1, the de-mercurized lean fuel gas from bed "a" or "b" of system 18"B" is fed through baghouse 68"b" to remove any particulate matter from the desulfurized and de-mercurized gas which provides a clean, lean fuel gas (LFG) for power generation by turbine 66 (FIG. 1), with its hot exhaust being directed through boiler 67 to raise steam and generate secondary power from the existing steam turbine. The herein equipment is configured in such a way as to be capable to substitute bed "b" for bed "a" as conditions warrant when bed "a" is saturated with mercury or vice-versa. To recover the mercury as a valuable by-product, FIG. 5 shows a miniature pyrolyzer, which is provided as part of the mercury recovery system; it is indirectly heated to vaporize the mercury from the carbon and be separated from the carbon by way of condensation. The separated mercury in vapor form is cooled in a condenser to convert it into a valuable, pure mercury in liquid form.
4. Particulate Matter—In the case of particulate matter, the coal is not pulverized, but it is used as delivered from the mine. Within the method herein described by means of FIG. 1, the coal pyrolysis and hot gas cleanup of both the lean fuel gas (LFG) and the flue gas from power generation are continuously maintained in an environment which is closed to the atmosphere to physically eliminate emissions. Each gas is separately delivered to char gasifier (reducer) 11 or $CO_2$ reducer (gasifier) 12 wherein ash is melted to form a glassy, inert slag which can be a marketable product instead of a hazardous waste.
5. Coal Ash—The method herein described integrates the pyrolysis of the coal in pyrolyzer 10, producing a coal gas and a hot incandescent char which are separated in chamber 22, with the hot char fed by way of lockhopper 27 into gasifier (reducer) 11, in which the ash in the char is melted during the gasification of the char at such a high enough temperature to insure that the constituents of the ash within the char and that which originates from the ponds that are still used and had been used, to store ash from coal combustion in boilers are fully melted into a glassy, inert slag.
6. Carbon Dioxide ($CO_2$)—The carbon dioxide is formed during the combustion of the lean fuel gas with air in gas turbine 66. When lean fuel gas is also combusted in boiler 67 as a supplement for additional thermal energy input, the energy from the hot exhaust flue gas directed from gas turbine 66 to boiler 67 is augmented. The total flue gas ($N_2+CO_2$) leaving boiler 67, is directed to the $CO_2$ reducer which is in the Huff mode whether it is 11 or 12 shown in FIG. 1, where the $N_2+CO_2$ is converted by the hot char to $N_2+2CO$. Thus, the $CO_2$, instead of being captured and sequestered in a geologic formation, is converted to a feedstock (N₂+2CO) to produce fertilizer, a very valuable product.

DISCUSSION

The detail discussion of the eight improvements listed in the INTRODUCTION of the instant application is now made beginning with Item 1, which covers "The physical separation of Gasification of char from Reduction of $CO_2$ for improved product fuel gas quality and for improved yield of 2CO from $CO_2$," and incorporating Item 2 which is related to, "Superior control system for a more reliable process operability."

Reference is now made to the issued patent (U.S. Pat. No. 7,998,236 B2), Col. 4, lines 65, 66 and 67, and Col. 5, lines 1 through 7, stating the following: "It is to be noted that the injection of gases at points 27, 28, and 29 are configured in such a way as to distribute the gases circumferentially via manifolds into gasifier 11. The injection of the oxygen containing gas at the top of gasifier 11 serves to raise the temperature of the hot char to such an extent as to insure that all the $CO_2$ contained in the flue gas injected into gasifier 11 is fully reduced to CO. The injection of the oxygen containing gas towards the bottom of gasifier 11 serves to consume the carbon in the char to produce a low Btu Gas (lean gas)." FIG. 1 of the referenced patent shows injection manifold 27 at the top for oxygen containing gas; injection manifold 28 for N₂+$CO_2$ (a flue gas from power plant 17), at roughly one-third down from the top of gasifier 11 and injection manifold 29 towards the bottom for oxygen containing gas. Upon scrutiny of this arrangement it has been concluded that the temperature of the char at the top will rise and the conversion of $CO_2$ to 2CO will occur somewhere around injection manifold 28, but as the 2CO passing through injection manifold 29 where the oxygen containing gas is injected to gasify the char into a lean gas, the 2CO is bound to convert back to $CO_2$ by virtue of oxygen presence by way of the injection of the oxygen containing gas as 2CO is avid for oxygen at the temperature to gasify char and melt ash into slag.

Therefore to avoid this re-oxidation of 2CO back to $CO_2$, the improvement herein presented by the Applicant is to completely divorce the gasification step from the reduction step by providing two separate vessels 11 and 12 as shown in FIGS. 1 and 2 of the instant specification that are designed to operate as follows: When vessel 11 operates as a gasifier producing lean fuel gas independently, vessel 12 operates as a reducer also independently converting $CO_2$ to 2CO, and vice-versa, as explained hereintofore to prevent re-oxidation of 2CO back to $CO_2$.

In order to achieve this improvement, bifurcated pipe numeral 23 in FIG. 1 of the instant specification, is provided for feeding hot char to either vessel 11 or vessel 12 using valves 29 and 28 as well as a controls system comprising valves 128, 129, 130 and 131 to guarantee the flow of lean fuel gas and 2CO to the proper cleanup vessels 46"a" and 46"b".

Referring to Items 3 and 4, "A better method of heating coal in devolatilizer 10", and "Drastic reduction of heat loss from it," the improvement entails a unique and efficient approach to devolatilize a fossil fuel using coal by way of example but without combusting it. The reference patent does not give details with respect to the manner the coal is devolatilized except for the combusting of some coal within pyrolyzer 10. Referring to Col. 4, line 13 through line 30 of the referenced patent (U.S. Pat. No. 7,998,236 B2), states the following: "Referring to FIG. 1 and assuming the process is running at steady state, coal hopper 18 supplies coal to feeder 19 which in turn drops a measured amount of coal into charging chamber 53, and charging mechanism 20 force feeds the coal into devolatilizer 10. An injector marked by numeral 52 injects a measured amount of an oxygen-containing gas into the charged coal causing the combustion of a small portion of the coal under suppressed conditions, releasing a sufficient quantity of thermal energy which causes the devolatilization of the coal and thus converting the coal into a hydrogen ($H_2$) rich gas according to reaction #1.

(1)

Since devolatilizer 10 is a long horizontal piece of equipment shown in FIG. 1 of the referenced patent, combustion of coal under suppressed combustion must substantially take place along the entire length of the devolatilizer. One way to successfully accomplish this, is the insertion of a long, water-cooled pipe in the form of a lance to reach the coal contents, which must be used within the devolatilizer. In order to not cause damage to such lance, it must be water-cooled, which takes away heat from the act of combustion. Further combustion within the devolatilizer causes voids within the coal charged which detract efficient energy transfer by conduction. Another factor that reduces efficiency in heat transfer is the deposit of some ash that with time accumulates within the horizontal devolatilizer 10. Damage to the water cooled lance is a common occurrence, such as nozzles along the length of the lance plugging; water leaks produce super-heated steam in confined surroundings that could lead to explosions.

To address these issues, the instant invention discloses an improved approach of heating the coal bi-directionally as an annulus wherein no combustion of coal or char takes place in pyrolyzation chamber 21 based on heating the coal annulus by means of two pipes, a large outer pipe forming the outer perimeter of the annulus, and a small inner pipe disposed inside the large pipe forming the inner perimeter of the annulus. These two pipes can be heated by combusting gases to heat the outside perimeter of the large pipe and the inside perimeter of the small pipe, while depending on conductive thermal energy transfer, thus completely avoiding the combustion of coal in devolatilizer 10, with the thermal energy originating from the volatile matter, the gas produced from the devolatilization of the coal itself. Preferably the outer pipe is to be heated externally by induction while the inner pipe being heated internally with hot flue gas as shown in FIGS. 2 and 2A of the instant specification and the detailed structure having been described in detail heretofore wherein the hot flue gas created in elbow 22 which is downstream of pyrolyzer 10, is directed through tunnel 77 formed within inner pipe 76.

With respect to improvement 5, the reference patent discloses nothing in relation to utilizing the existing coal burning boiler as the heat recovery steam generator and the existing steam turbine of a coal burning power station to mate with a new combustion gas turbine to result in generating combined cycle power which is fueled with clean, de-mercurized, lean fuel gas produced from gasification of char that is being operated in the Puffing mode. From the standpoint of capital investment, there are substantial savings at the power end by virtue that the equipment involved in generating combined cycle electric power, a new steam cycle comprising the heat recovery steam generator (HRSG) and the steam turbine roughly represent two-thirds of the total combined cycle configurations cost while the gas combustion turbine being one-third. Therefore repowering existing coal burning plants which are destined to be shut down, while using existing equipment, makes economic sense by the addition of a new gas combustion turbine and its installation to existing facilities. The approach presented herein will result in considerably reducing the capital requirement towards the providing of a clean and efficient combined cycle power generation which also prevents the closure of existing coal burning power stations.

With respect to improvements 6, 7, and 8 referenced in the INTRODUCTION section of the current application, which are of importance which the referenced patent is mute. These improvements are detailed in the Description and Operation sections of the herein specification.

Based on the test work done and the herein description, the objectives listed towards the beginning of this disclosure are achievable. It is submitted herein that the instant method and apparatus provide major improvements over the referenced issued patent, and the conventional practice of combusting coal in boilers. The details of construction mentioned above are for the purpose of description and not limitation, since other configurations are possible without departing from the spirit of the invention. Further, other materials besides coal can be processed in the method herein described as well as this invention is not only suitable for generating electric power as it can also be used in other applications such as metallic ores converted to metals, disposal of wastes into products, making metallurgical coke, etc., while still providing a technology which prevents the discharge of pollutants into the atmosphere.

It will be understood by those skilled in the art that while the present invention has been disclosed above with reference to certain embodiments, various modifications, additions and changes can be made to the invention without departing from spirit and scope of the invention as set forth in the following claims.

I claim:

1. An improved method for processing a hydrocarbon fuel into clean energy comprising the following steps:
    charging a hydrocarbon fuel into the charging end of an elongated chamber which is closed to the atmosphere, to process it under pressure while advancing the hydrocarbon fuel towards the discharge end of said elongated chamber;
    pyrolyzing said hydrocarbon fuel in said elongated chamber to yield a hot carbon characterized as hot char, and a hot gas characterized as a volatile matter;
    feeding said hot char into two separate vessels identified as vessel A and vessel B;
    injecting a gas containing oxygen into said vessel A which acts as a gasifier to convert some of said hot char into a fuel gas which is cleaned prior to being put into use;
    utilizing said fuel gas by combusting it for the generation of energy while producing a flue gas containing N2+CO2;
    directing said flue gas to said vessel B which acts as a reducer, to convert said $N_2+CO_2$ by reacting it with said hot char contained in said vessel B, to produce $N_2+2CO$;
    converting said N2+2CO into a by-product;
    repeating the preceding steps of injecting a gas containing oxygen, utilizing said fuel gas, directing said flue gas, and converting said N2+2CO wherein vessel B acts as a gasifier while vessel A acts as a reducer; and
    continuing a procedure of alternating the functions of vessel A and vessel B in such a manner that when vessel A acts as a gasifier (Puffing mode which is exothermic), vessel B acts as a reducer (Huffing mode which is endothermic) and when vessel B acts as a gasifier (Puffing mode), vessel A acts as a reducer (Huffing mode).

2. The method as set forth in claim 1 wherein said step of charging a hydrocarbon fuel into the charging end of an elongated chamber is further characterized by said hydrocarbon fuel being coal.

3. The method as set forth in claim 1 wherein said step of pyrolyzing said hydrocarbon fuel in said elongated chamber is further characterized by said hydrocarbon fuel being coal.

4. The method as set forth in claim 3 wherein said coal is heated bi-directionally within said elongated chamber while producing hot char and volatile matter.

5. The method as set forth in claim 3 wherein said hydrocarbon fuel being coal is further characterized by the step of utilizing said coal as run-of-mine coal in order to skip its pulverization producing pulverized coal which causes pollution from particulate matter.

6. The method as set forth in claim 1 wherein said step of feeding said hot char into two separate vessels is further characterized by said separate vessels being identical.

7. The method as set forth in claim 1 wherein said step of injecting a gas containing oxygen is further characterized by the step of injecting air in order to produce a lean fuel gas to increase its mass and reduce $NO_x$ formation when said lean fuel gas is combusted.

8. The method as set forth in claim 7 wherein said step of injecting air in order to produce a lean fuel gas to increase mass and reduce $NO_x$ formation when said lean fuel gas is combusted is further characterized by the step of injecting said lean fuel gas into a combustion turbine to efficiently generate electric power while discharging a hot flue gas containing very low parts per million of $NO_x$.

9. The method as set forth in claim 8 wherein said step of injecting said lean fuel gas into a combustion turbine to efficiently generate electric power is further characterized by the step of combusting said lean fuel gas in said combustion turbine while forming the larger portion of a combined cycle electric power generation configuration and discharging a hot flue gas containing $NO_x+CO_2$ that is directed to a heat recovery steam generator to raise steam.

10. The method as set forth in claim 9 wherein said combined cycle power generation configuration is further characterized by the step of complementing said combined cycle with a boiler for raising steam and feeding such steam into a steam turbine while producing the smaller portion of said combined cycle electric power generation configuration.

11. The method as set forth in claim 10 wherein said step of complementing said combined cycle power with a boiler for raising steam and feeding such steam into a steam turbine is further characterized by a step of utilizing a coal burning electric power generating equipment which is heated by means of hot flue gas to result in reducing capital investment with respect to efficient electric power generation.

12. The method as set forth in claim 10 wherein said step of complementing said combined cycle with a boiler for raising steam is further characterized by the step of supplementing the combustion of clean, desulfurized and de-mercurized lean fuel gas in said boiler to increase the output of steam.

13. The method as set forth in claim 9 wherein said step of discharging said hot flue gas containing $NO_x+CO_2$ that is directed to a heat recovery steam generator to raise steam is further characterized by the step of directing said hot flue gas containing $NO_x+CO_2$ to a coal burning boiler to raise steam that is in turn directed to an existing steam turbine to generate electric power, to result in obviating, the need to combust coal in an existing coal burning plant to generate electric power.

14. The method as set forth in claim 9 wherein said hot flue gas containing $NO_x+CO_2$ that is directed to a heat recovery steam generator to raise steam is further characterized by the feeding of a hot flue gas containing $NO_x+CO_2$ to a compressor to raise its pressure and directing it to a bed of hot char in order to convert it into $N_2+2CO$, a chemical feedstock.

15. The method as set forth in claim 14 wherein said chemical feedstock is cleaned, de-mercurized and converted into a fertilizer.

16. The method as set forth in claim 14 wherein said step of feeding said hot flue gas containing $NO_x+CO_2$ to a compressor to raise its pressure and directing it to a bed of hot char in order to convert it into $N_2+2CO$ is further characterized by the step of passing said $N_2+2CO$ through a desulfurizer through a sulfur collecting sorbent which upon its regeneration yields elemental sulfur, a valuable by-product.

17. The method as set forth in claim 14 wherein said step of feeding said hot flue gas containing $NO_x+CO_2$ to a compressor to raise its pressure and directing it to a bed of hot char in order to convert it into $N_2+2CO$ is further characterized by the step of passing said $N_2+2CO$ through a bed of activated carbon to de-mercurize said $N_2+2CO$.

18. The method as set forth in claim 17 wherein said step of passing said $N_2+2CO$ through a bed of active carbon to de-mercurize said $N_2+2CO$ is further characterized by the step of recovering elemental mercury (Hg), a valuable product.

19. The method as set forth in claim 1 wherein said step of charging a hydrocarbon fuel into the charging end of an elongated chamber is further characterized by a step of configuring said elongated chamber to enable the formation of an annulus made up of said hydrocarbon fuel within said elongated chamber.

20. The method as set forth in claim 19 wherein said step of configuring said elongated chamber to enable the formation of an annulus is further characterized by a step of moving said annulus progressively towards the discharge end of said elongated chamber.

21. The method as set forth in claim 20 wherein said step of moving said annulus progressively towards the discharge end of said elongated chamber is further characterized by a step of heating said annulus continuously while moving it within said elongated chamber to produce hot volatile matter and hot char.

22. The method as set forth in claim 21 wherein said step of heating said annulus continuously while moving it within said elongated chamber to produce hot volatile matter and hot char is further characterized by a step of directing both said volatile matter and said hot char towards the discharge end of said elongated chamber.

23. The method as set forth in claim 22 wherein said step of directing both said volatile matter and said hot char is further characterized by a step of separating said volatile matter from said hot char at the discharge end of said elongated chamber.

24. The method as set forth in claim 23 wherein said step of separating said volatile matter from said hot char at the discharge end of said combustion chamber is further characterized by a step of combusting said volatile matter in an extension from said discharge end of said elongated chamber that serves as a combustion chamber for specifically volatile matter to produce a hot flue gas.

25. The method as set forth in claim 24 wherein said step of combusting said volatile matter in said extension from said discharge end of said elongated chamber is further characterized by discharging hot char from the end of said elongated chamber into a first vessel where said hot char is gasified, and into a second vessel wherein said hot char serves as a reducing agent.

26. The method as set forth in claim 21 wherein said step of heating said annulus continuously is further characterized by the step of heating it circumferentially as well as bi-directionally.

27. The method as set forth in claim 26 wherein said step of heating said annulus circumferentially as well as bi-directionally is further characterized by the step of providing thermal energy by way of conduction to heat said annulus.

28. The method as set forth in claim 27 wherein said step of providing thermal energy by way of conduction to heat said annulus is further characterized by the step of confining the outer diameter of said annulus by the inner wall of a hot metallic pipe.

29. The method as set forth in claim 28 wherein said step of confining the outer diameter of said annulus by the inner wall of a hot metallic pipe is further characterized by the step of heating said metallic pipe by means of electric induction.

30. The method as set forth in claim 27 wherein said step of providing thermal energy by way of conduction to heat said annulus is further characterized by the step of confining the inner diameter of said annulus by the outer wall of a hot metallic pipe through which a hot flue gas flows.

31. The method as set forth in claim 30 wherein said step of confining the inner diameter of said annulus by the outer wall of a hot metallic pipe is further characterized by the step of heating a metallic pipe by means of hot flue gas flowing within said metallic pipe, opposite to the direction of the movement of said annulus within said elongated chamber.

32. The method as set forth in claim 31 wherein said step of heating said metallic pipe by means of hot flue gas is further characterized by the step of forming said hot flue gas by combusting volatile matter in a combustion chamber downstream from said annulus.

33. The method as set forth in claim 1 wherein said step of injecting a gas containing oxygen into said vessel A which acts as a gasifier to convert some of said hot char into a fuel gas is further characterized by the step of also producing an inert slag from ash contained in said hot char while gasifying it.

34. The method as set forth in claim 33 wherein said step of also producing an inert slag from ash contained in said hot char while gasifying it is further characterized by the step of conjoining ash which is considered to be a pollutant, recovered from storage ponds with the ash contained in said hot char to form a common non-polluting inert slag which can be used as a product in road construction or as a feedstock in glassmaking.

* * * * *